(12) United States Patent
Gao et al.

(10) Patent No.: US 11,258,559 B2
(45) Date of Patent: Feb. 22, 2022

(54) METHODS AND APPARATUSES FOR DETERMINING A PHASE TRACKING REFERENCE SIGNAL CONFIGURATION PARAMETER

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/637,845

(22) PCT Filed: Aug. 12, 2017

(86) PCT No.: PCT/CN2017/097294
§ 371 (c)(1),
(2) Date: Feb. 10, 2020

(87) PCT Pub. No.: WO2019/033229
PCT Pub. Date: Feb. 21, 2019

(65) Prior Publication Data
US 2020/0252181 A1    Aug. 6, 2020

(51) Int. Cl.
*H04L 5/00* (2006.01)
*H04L 27/26* (2006.01)

(52) U.S. Cl.
CPC .......... *H04L 5/0048* (2013.01); *H04L 5/0007* (2013.01); *H04L 27/2613* (2013.01)

(58) Field of Classification Search
CPC ...... H04L 5/0048; H04L 5/005; H04L 5/0051
See application file for complete search history.

(56) References Cited

U.S. PATENT DOCUMENTS

| | | | |
|---|---|---|---|
| 2018/0359071 A1* | 12/2018 | Lee | H04L 5/0092 |
| 2020/0008228 A1* | 1/2020 | Lee | H04W 72/1284 |
| 2020/0213050 A1* | 7/2020 | Chen | H04L 5/0048 |
| 2020/0235979 A1* | 7/2020 | Yokomakura | H04L 27/261 |

FOREIGN PATENT DOCUMENTS

| | | |
|---|---|---|
| CN | 106507695 A | 3/2017 |
| WO | 2014/154294 A1 | 10/2014 |
| WO | 2015/119559 A1 | 8/2015 |

OTHER PUBLICATIONS

International Search Report of PCT/CN2017/097294 dated May 7, 2018 [PCT/ISA/210].
Written Opinion of PCT/CN2017/097294 dated May 7, 2018 [PCT/ISA/237].

* cited by examiner

*Primary Examiner* — Kevin Kim
(74) *Attorney, Agent, or Firm* — Sughrue Mion, PLLC (57) ABSTRACT

Embodiments of the present disclosure relate to methods, terminal device, network device and apparatuses for determining a Phase Tracking Reference Signal (PTRS) configuration parameter. In an embodiment of the present disclosure, the method of interference measurement comprises determining a PTRS transmission resource configuration parameter based on a resource allocation type to be used in data transmission. With embodiments of the present disclosure, it may determine different PTRS configuration parameters for different resource allocation types, and thus provide a more suitable PTRS configuration solution for different resource allocation cases.

11 Claims, 11 Drawing Sheets

TABLE 1A Association Between the PTRS and Scheduled MCS

| Scheduled MCS | Time density |
|---|---|
| $0 <= MCS < MCS_1$ | No PTRS |
| $MCS_1 <= MCS < MCS_2$ | $TD_1$ |
| $MCS_2 <= MCS < MCS_3$ | $TD_2$ |
| $MCS_3 <= MCS < MCS_4$ | $TD_3$ |

Fig. 1A

TABLE 1B Association Between the PTRS and Scheduled BW

| Scheduled BW | Frequency density |
|---|---|
| $0 <= N_{RB} < N_{RB1}$ | No PTRS |
| $N_{RB1} <= N_{RB} < N_{RB2}$ | $FD_1$ |
| $N_{RB2} <= N_{RB} < N_{RB3}$ | $FD_2$ |
| $N_{RB3} <= N_{RB} < N_{RB4}$ | $FD_3$ |
| $N_{RB4} <= N_{RB} < N_{RB5}$ | $FD_4$ |
| $N_{RB5} <= N_{RB}$ | $FD_5$ |

TABLE 2 Association Table for RA Type 0

| Scheduled BW | Frequency density |
|---|---|
| $0 <= N_{RB} < N_{RB1\_1}$ | No PTRS |
| $N_{RB1\_1} <= N_{RB} < N_{RB2\_1}$ | $FD_{1\_1}$ |
| ... | ... |
| $N_{RBi\_1} <= N_{RB} < N_{RB(i+1)\_1}$ | $FD_{i\_1}$ |

Fig. 4A

TABLE 3A Association Table for RA Type 2, Localized mode

| Scheduled BW | Frequency density |
|---|---|
| $0 <= N_{RB} < N_{RB1\_2}$ | No PTRS |
| $N_{RB1\_2} <= N_{RB} < N_{RB2\_2}$ | $FD_{1\_2}$ |
| ... | ... |
| $N_{RBj\_2} <= N_{RB} < N_{RB(j+1)\_2}$ | $FD_{j\_2}$ |

Fig. 4B

TABLE 3B Association Table for RA Type 2, Localized mode

| Scheduled BW | Frequency density |
|---|---|
| $0 <= N_{RB} < N_{RB1\_3}$ | No PTRS |
| $N_{RB1\_3} <= N_{RB} < N_{RB2\_3}$ | $FD_{1\_3}$ |
| ... | ... |
| $N_{RBk\_3} <= N_{RB} < N_{RB(k+1)\_3}$ | $FD_{j\_3}$ |

METHODS AND APPARATUSES FOR DETERMINING A PHASE TRACKING REFERENCE SIGNAL CONFIGURATION PARAMETER

CROSS REFERENCE TO RELATED APPLICATIONS

This application is a National Stage of International Application No. PCT/CN2017/097294, filed Aug. 12, 2017.

FIELD OF THE INVENTION

The non-limiting and exemplary embodiments of the present disclosure generally relate to the field of wireless communication techniques, and more particularly relate to a method, terminal device and apparatus for determining a Phase Tracking Reference Signal (PTRS) configuration parameter at terminal device and a method, network device, apparatus for determining PTRS configuration parameter at a network device.

BACKGROUND OF THE INVENTION

New radio access system, which is also called as NR system or NR network, is the next generation communication system. In Radio Access Network (RAN) #71 meeting for the third generation Partnership Project (3GPP) working group, study of the NR system was approved. The NR system will consider frequency ranging up to 100 Ghz with an object of a single technical framework addressing all usage scenarios, requirements and deployment scenarios defined in Technical Report TR 38.913, which includes requirements such as enhanced mobile broadband, massive machine-type communications, and ultra-reliable and low latency communications.

Discussion of multi-antenna scheme for new radio access started from May in 2016, including following aspects:
Multi-antenna scheme
Beam management
channel state information (CSI) acquisition
Reference signal and Quasi-Colocation (QCL)

In the NR system, it was already agreed to introduce Phase Tracking Reference Signal (PTRS) to track phase noise, especially for higher frequency bands. It was also agreed that the PTRS is associated with one Demodulation Reference Signal (DMRS) in a DMRS port group and the association can determined in the specification.

In the NR system, the PTRS density is associated with scheduled Modulation and Coding Scheme (MCS)/Band Width (BW). Specifically, the PTRS time density is associated with scheduled MCS while the PTRS frequency density is associated with the scheduled BW.

Figure 1A:
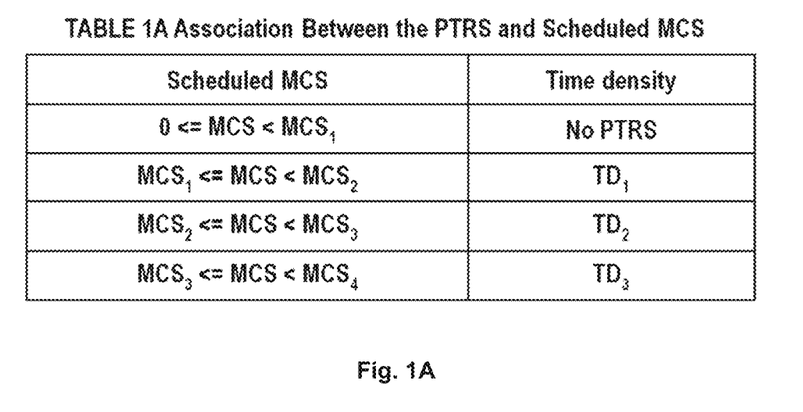
FIGS. 1A and 1B schematically illustrate association tables between PTRS density and scheduled BW/MCS in the prior art.
Figure 1B:
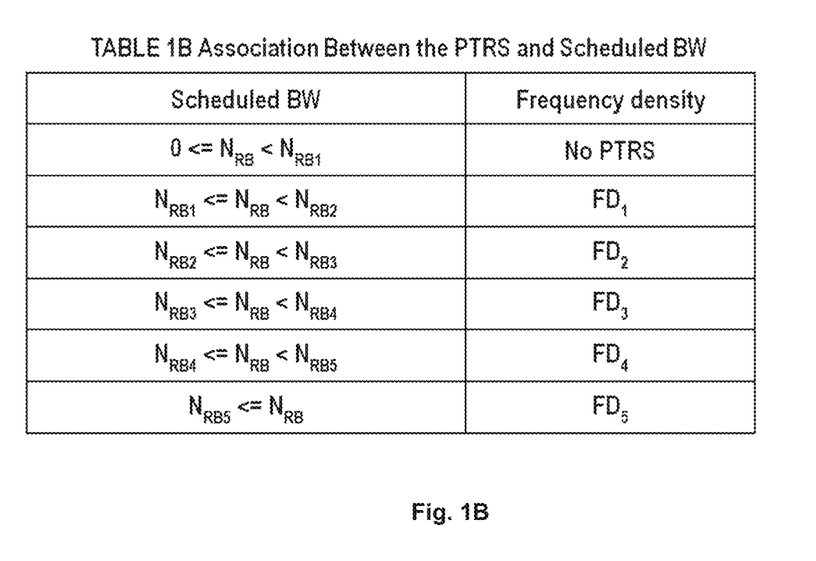

In 3GPP technical document R1-1709521, there were proposed associations between the PTRS and scheduled MCS/BW. Particularly, in R1-1709521, it was proposed that for Single User Multiple-Input Multiple-Output (SU-MIMO), it supports predefined and RRC-configured association between PTRS densities and scheduled MCS/BW. Table 1 as illustrated in FIG. 1A is used to represent association between PTRS time density and scheduled MCS and Table 2 as illustrated in FIG. 1B was used to represent association between PTRS frequency density and scheduled BW. The number of rows in Tables 1 and 2 can be reduced if the densities are down-selected. In addition, whether RRC configuration can override the predefined association, whether UE is to suggest MCS/BW thresholds of association tables as illustrated in FIGS. 1A and 1B and complementary Downlink Control Information (DCI) signaling are for further study.

SUMMARY OF THE INVENTION

In the existing solution of the NR system, the PTRS frequency density is associated with scheduled MCS/BW only. However, such a solution cannot meet requirements for different scenarios.

To this end, in the present disclosure, there is provided an improved solution of interference measurement to mitigate or at least alleviate at least part of the issues in the prior art.

According to a first aspect of the present disclosure, there is provided a method for determining a Phase Tracking Reference Signal (PTRS) configuration parameter at a terminal device. The method may comprise determining a PTRS transmission resource configuration parameter based on a resource allocation type to be used in data transmission.

According to a second aspect of the present disclosure, there is provided a method for determining a Phase Tracking Reference Signal (PTRS) configuration parameter at a network device. The method may comprise determining a PTRS transmission resource configuration parameter based on a resource allocation type to be used in data transmission.

According to a third aspect of the present disclosure, there is provided a terminal device. The terminal device may comprise a controller, configured to determine a PTRS transmission resource configuration parameter based on a resource allocation type to be used in data transmission.

According to a fourth aspect of the present disclosure, there is provided a network device. The network device may comprise a controller configured to determine a PTRS transmission resource configuration parameter based on a resource allocation type to be used in data transmission.

According to a fifth aspect of the present disclosure, there is provided a computer-readable storage media with computer program codes embodied thereon, the computer program codes being configured to, when executed, cause an apparatus to perform actions in the method according to any embodiment in the first aspect.

According to a sixth aspect of the present disclosure, there is provided a computer-readable storage media with computer program codes embodied thereon, the computer program codes being configured to, when executed, cause an apparatus to perform actions in the method according to any embodiment in the second aspect.

According to a seventh aspect of the present disclosure, there is provided a computer program product comprising a computer-readable storage media according to the fifth aspect.

According to an eighth aspect of the present disclosure, there is provided a computer program product comprising a computer-readable storage media according to the sixth aspect.

With embodiments of the present disclosure, it may determine different PTRS configuration parameters for different resource allocation types, and thus provide a more suitable PTRS configuration solution for different resource allocation cases.

BRIEF DESCRIPTION OF THE DRAWINGS

The above and other features of the present disclosure will become more apparent through detailed explanation on the embodiments as illustrated in the embodiments with reference to the accompanying drawings, throughout which like reference numbers represent same or similar components and wherein.

DETAILED DESCRIPTION OF EMBODIMENTS

Hereinafter, the solution as provided in the present disclosure will be described in details through embodiments with reference to the accompanying drawings. It should be appreciated that these embodiments are presented only to enable those skilled in the art to better understand and implement the present disclosure, not intended to limit the scope of the present disclosure in any manner.

In the accompanying drawings, various embodiments of the present disclosure are illustrated in block diagrams, flow charts and other diagrams. Each block in the flowcharts or blocks may represent a module, a program, or a part of code, which contains one or more executable instructions for performing specified logic functions, and in the present disclosure, a dispensable block is illustrated in a dotted line. Besides, although these blocks are illustrated in particular sequences for performing the steps of the methods, as a matter of fact, they may not necessarily be performed strictly according to the illustrated sequence. For example, they might be performed in reverse sequence or simultaneously, which is dependent on natures of respective operations. It should also be noted that block diagrams and/or each block in the flowcharts and a combination of thereof may be implemented by a dedicated hardware-based system for performing specified functions/operations or by a combination of dedicated hardware and computer instructions.

Generally, all terms used in the claims are to be interpreted according to their ordinary meaning in the technical field, unless explicitly defined otherwise herein. All references to "a/an/the/said [element, device, component, means, step, etc.]" are to be interpreted openly as referring to at least one instance of said element, device, component, means, unit, step, etc., without excluding a plurality of such devices, components, means, units, steps, etc., unless explicitly stated otherwise. Besides, the indefinite article "a/an" as used herein does not exclude a plurality of such steps, units, modules, devices, and objects, and etc.

Additionally, in a context of the present disclosure, a user equipment (UE) may refer to a terminal, a Mobile Terminal (MT), a subscriber station, a portable subscriber station, Mobile Station (MS), or an Access Terminal (AT), and some or all of the functions of the UE, the terminal, the MT, the SS, the portable subscriber station, the MS, or the AT may be included. Furthermore, in the context of the present disclosure, the term "BS" may represent, e.g., a node B (NodeB or NB), an evolved NodeB (eNodeB or eNB), gNB (Node B in NR system), a radio header (RH), a remote radio head (RRH), a relay, or a low power node such as a femto, a pico, and so on.

As mentioned in Background, the PTRS frequency density is associated with scheduled MCS/BW only; however such a solution cannot meet requirements for different scenarios. For example, in the NR system, it was already agreed to use Long Term Evolvement LTE Type 0 and Type 2 allocation as the resource allocation schemes in the NR system. In the frequency domain, for Physical Uplink Shared Channel (PUSCH) with Discrete Fourier Transform spread Orthogonal Frequency Division Multiplexing DFT-s-OFDM waveform in the NR, system, contiguous resource allocation scheme based on LTE UL RA Type 0 is adopted in Rel. 15. A coarser granularity (i.e. more than 1 RB) of resource assignment in order to reduce the overhead further and BW parts are still remained for further study. A DCI format with resource allocation based on LTE Downlink (DL) RA type 0 (i.e., bit-map) and a DCI format with resource allocation based on LTE DL RA type 2 are supported for Physical Downlink Shared Channel (PDSCH). A DCI format with resource allocation based on LTE DL RA type 0 (i.e., bit-map) is supported for PUSCH with Cyclic Prefix Orthogonal Frequency Division Multiplexing (CP-OFDM) waveform and a DCI format with resource allocation based on LTE uplink (UL) RA type 0 is supported for PUSCH with CP-OFDM waveform and with DFT-s-OFDM waveform. Whether some or all of the above DCI formats have the same DCI payload size is for further study.

Thus, it can be seen that for the DCI format, the NR system at least supports two RA types, i.e., RA types 0 and RA type 2, and the LTE UL RA type 0 and LTE DL RA type 0 are also different. For illustration purposes, references will be made to FIG. 2A to 2C to describe the RA types in brief.

Figure 2A:
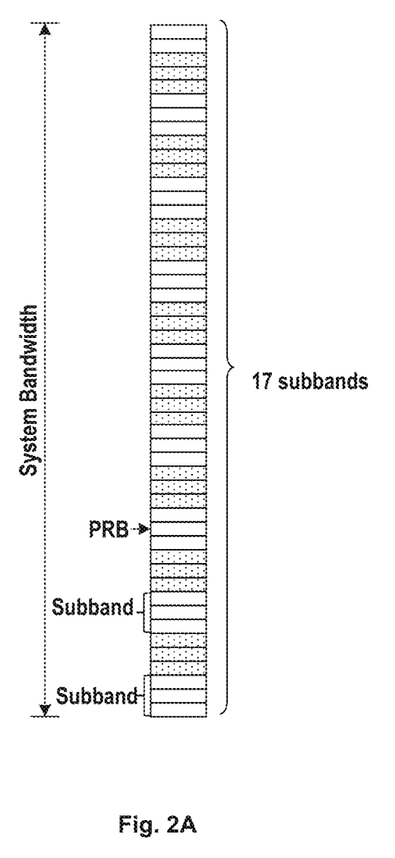
FIGS. 2A to 2C schematically illustrate example resource allocation types might be used in the NR system.
Figure 2B:
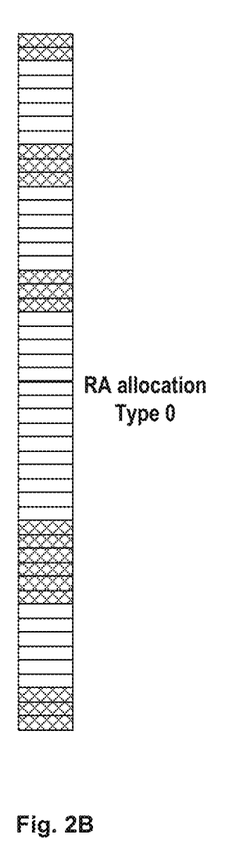
Figure 2C:
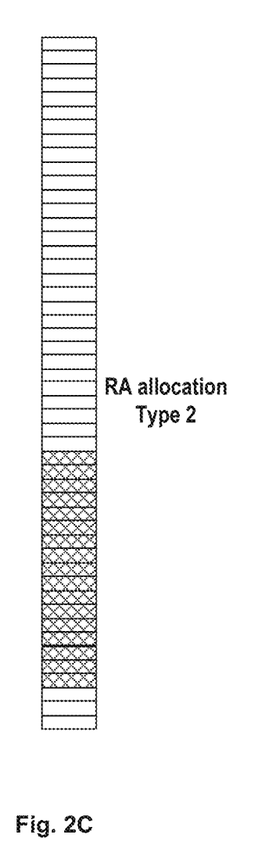

As illustrated in FIG. 2A, the system bandwidth comprises for example 50 physical resource blocks (PRBs). For RA type 0, the system bandwidth will be divided into 17 subband each containing three PRBs except the last RBG which contains only 2 PRBs. In RA type 0, the resource allocation is based on the subband, and a bit map of 17 bits will be used to indicate resource allocation and FIG. 2B illustrates an example resource allocation using RA Type 0. For RA type 2, the resource allocation is based on PRBs, and there are two allocation modes, continuous mode (or localized mode) and distributed mode. In the continuous mode, a segment of continuous PRBs will be allocated as illustrated in FIG. 2C; while in the distributed mode, the allocated PRB indexes are continuous but they will be mapped to the transmission resource with a certain gap.

However, as already mentioned, in the NR system, the PTRS frequency density is associated with scheduled MCS/BW/SCS only and thus such a PTRS association is not suitable.

In order to address or at least mitigate the above problem, in the present disclosure, there is proposed an improved solution of PTRS configuration. For illustrative purposes, reference will be made to FIGS. 3 to 7 and 12 to 14 to describe the solution of determining PTRS configuration parameters as proposed in the present disclosure. It shall be appreciated that all embodiments are given for illustrative purposes and the present disclosure is not limited thereto.

Figure 3:
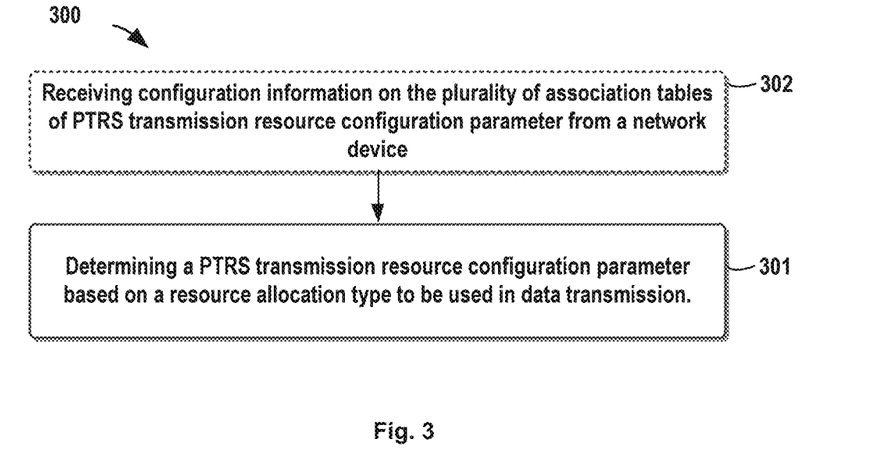
FIG. 3 schematically illustrates a flow chart of a method for determining PTRS configuration parameters at a terminal device according to an embodiment of the present disclosure.

FIG. 3 schematically illustrates a flow chart of a method 100 for determining a PTRS configuration parameter at a terminal device according to an embodiment of the present disclosure. The method 300 can be performed at a terminal device, for example UE, or other like terminal devices.

As illustrated in FIG. 3, first in step 301, the terminal device may determine a PTRS transmission resource configuration parameter based on a resource allocation type to be used in data transmission.

The term "PTRS transmission resource configuration parameter" used herein refers to a configuration parameter for the PTRS transmission resource, which can include for example, PTRS frequency density, PTRS resource table, PTRS resource mapping, PTRS transmission positions, etc. The term "resource allocation type" used herein refers to the manner in which the resource is allocated, which for example, include RA type 0, RA type 2, etc. However, it shall be understood that the RA types are not limited to these; instead, the NR system might support new RA types or other RA types different from those listed. In fact, the present disclosure can be applied to all of these RA types, but hereinafter, for illustration purposes, RA Type 0 and Type 2 will be taken as examples.

It can be appreciated that the PTRS frequency density/presence association only considers number of PRBs or scheduled BW, there may be some issues for different resource allocation types. For example, for the 50 RBs, one RA scheme is to adopt RA type 2 with localized allocation and 17 continuous RBs is allocated, as illustrated in FIG. 2C); in such case, the PTRS frequency density is e.g. ¼, and then perhaps 4 RBs with PTRS are enough. While for the other RA scheme of RA type 0 with the subband size of 3, if 17 RBs is allocated (for example, as illustrated in FIG. 2B), if the subband interval in frequency domain is large, 4 RBs with PTRS are not insufficient and more RBs with PTRS might be needed. Thus, in the NR system, it is proposed to use different PTRS transmission resource configuration parameters for different resource allocation types.

The network device may indicate the resource allocation type to the terminal device in any suitable manner. For example, the resource allocation type can be dynamically indicated in DCI. Based on the detected RA type, for example, it can select a table corresponding to the detected RA type.

In an embodiment of the present disclosure, the terminal device may determine an association table corresponding to the resource allocation type from a plurality of association tables of PTRS transmission resource configuration parameter for a plurality of resource allocation types. Additionally, the terminal device may further obtain the PTRS transmission resource configuration parameter from the association table.

The plurality of association tables can be predetermined tables in the terminal device. Or alternatively, these tables may be configured in a higher layer signaling, e.g. via Radio Resource Control (RRC) signaling or Media Access Control Control Element (MAC CE). Thus, in step 302, the terminal device may further receive configuration information on the plurality of association tables of PTRS transmission resource configuration parameter from a network device. The configuration information can be new configuration information or configuration update information. Thus, the operation recited in step 302 can be performed before step 301 or after step 301.

Figure 4A:
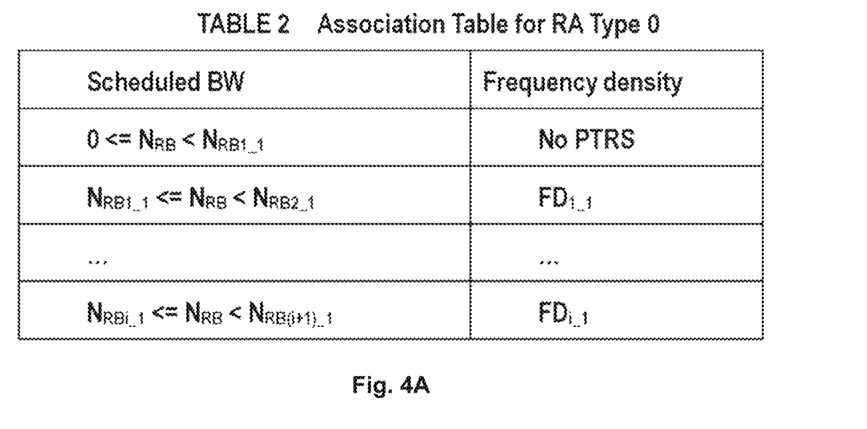
FIGS. 4A to 4C schematically illustrate example association tables of PTRS configuration parameters for different resource allocation types according to embodiments of the present disclosure.
Figure 4B:
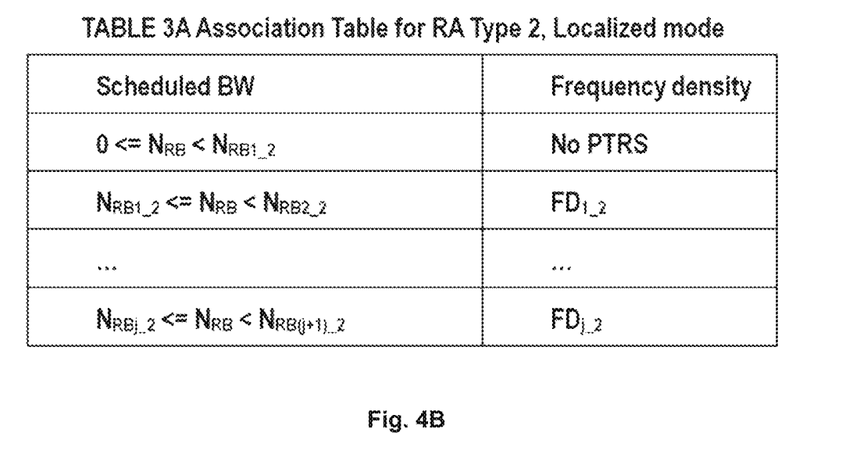
Figure 4C:
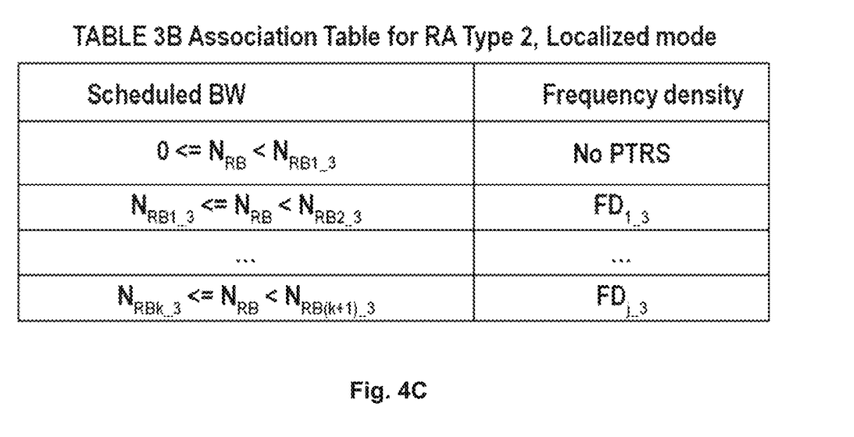

Next, for illustration purposes, reference will be made to FIGS. 4A to 4C to describe example association tables for the PTRS configuration parameters. As illustrated in FIGS. 4A to 4C, there are provided three tables, Table 2, Table 3A and Table 3B, respectively for RA Type 0, RA type 2 in localized mode, and RA Type 2 in distributed mode.

Specifically, for RA type 0, the PTRS frequency density can be based on Table 2. For example, the PTRS frequency density can be associated with scheduled BW or number of PRBs. In addition, it shall be understand, additionally or alternatively, the PTRS frequency density can be associated with the size of the resource segment, i.e. the number of the continuous PRB, or the size of RBG For example, for each RBG there is one PTRS. For RA type 2, the PTRS frequency density can be based on a different table from Table 2. For example, the PTRS frequency density may be associated with scheduled BW, e.g. number of PRBs. For RA type 2 with localized mode, the PTRS frequency density is based on Table 3A and For RA type 2 with distributed mode, the PTRS frequency density is based on Table 3B. From the three tables, it can be seen that both respective PTRS frequency densities and thresholds for using PTRS can be different. In addition, for RA Type 2, for different resource allocation modes (for example, the localized allocation and the distributed allocation), they can be configured with different tables. For example, for a given number of PRBs, the frequency density for localized allocation mode may be smaller than that for distributed allocation mode.

It shall be noted that the tables as illustrated in FIG. 4A to 4C are just given for illustration purposes and the present disclosure is not limited thereto. There can be other options for designing the association tables. For example, it is also possible that Type 2 with the distributed mode can share the common table with RA type 0. As another example, it is also possible that RA type 0 can be divided into different allocation modes which could use different association tables. For example all possible patterns of the bitmap can be divided to two allocation modes, those with continuous or localized allocation, and those with distributed allocations. Further, those distributed allocations can be further divided based on the distributed degree. In such a case, it may use more association tables for different distributed modes.

In another embodiment of the present disclosure, the terminal device may determine a resource mapping corresponding to the resource allocation type from a plurality of resource mappings of PTRS transmission for a plurality of resource allocation types. Further, it is also possible to further obtain the PTRS transmission resource configuration parameter based on the resource mapping. As an example, it may use different mapping schemes for different RA types. For example, there can be a mapping scheme for RA type 0, another mapping scheme for RA type 2 with localized mode, and a further mapping scheme for RA type 2 with distributed mode. That is to say, different mapping schemes are used for different RA types and the plurality of resource mappings further comprises different resource mappings for different allocation modes in the same resource allocation type.

It is also possible to adopt other mapping schemes. For example, it is also possible that Type 2 with distributed mode can share the common mapping scheme with RA type 0. As another example, it is also possible that RA type 0 can be divided into different allocation modes which could use different mapping schemes. For example all possible patterns of the bitmap can be divided to two allocation modes, those with continuous or localized allocation, and those with distributed allocations. Further, those distributed allocations can be further divided based on the distributed degree. In such a case, it may use more mapping schemes for different distributed modes.

Figure 5:
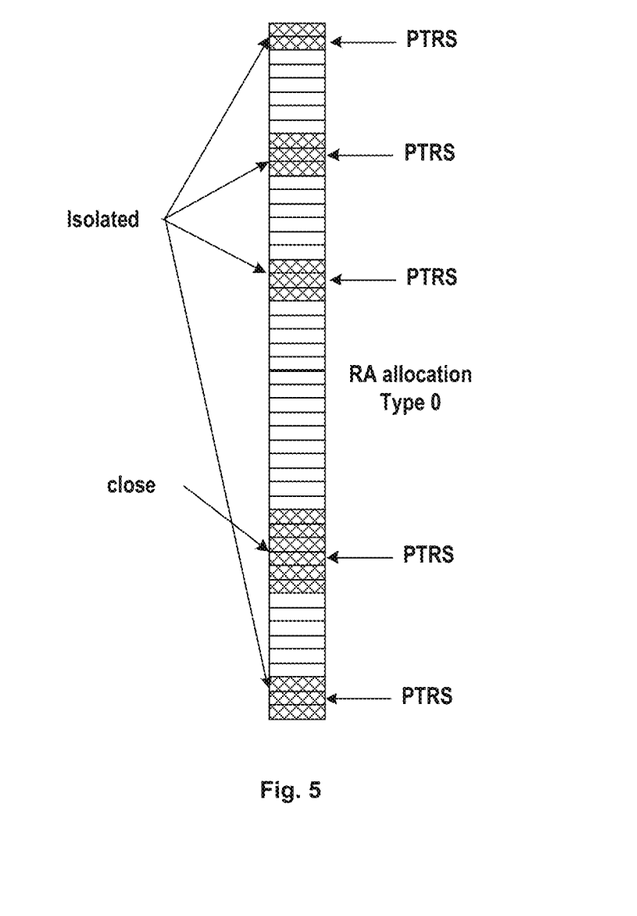
FIG. 5 schematically illustrates another example association solution according to embodiments of the present disclosure.

In a further embodiment of the present disclosure, the PTRS transmission resource configuration parameter can be associated with sizes of respective resource segments within allocated transmission resources. For example, for RA Type 0 (bitmap), the PTRS frequency density can be associated with the size of the resource segment, i.e. the number of the continuous PRB, or the size of RBG In an embodiment of the present disclosure, the resource segments can be divided into different kinds, each of which is configured with different mapping schemes. For example, the resource segment can be divided into isolated segments, and close or continuous segment, as illustrated in FIG. 5. Those resource segments containing only one subband can be identified as isolated segment while those containing more than one subband can be identified as close segment. In such a case, for an isolated segment, at least one PTRS is mapped on the RBG; whereas for a continuous or close segment, the PTRS can be mapped based on the density association table but the scheduled BW is based on the continuous number of RBs instead of the number of totally scheduled RBs.

It shall be noted that FIG. 5 is just given for illustration purposes and the skilled in the art is not limited thereto. The identification rules of the isolated segment and the close or continuous segment can be changed based on requirements. For example, those resource segments containing one or two subbands can be identified as isolated segment while those resource segments containing more than two subbands can be identified as close segment.

In another embodiment of the present disclosure, the PTRS frequency density can also be associated with the distance between two adjacent resource segments. For example, it may set a distance threshold d. If there are less than d PRBs between two adjacent resource segments, then the PTRS will have a low frequency density, while if there are more than d PRBs therebetween, the PTRS will have a high frequency density.

Figure 6A:
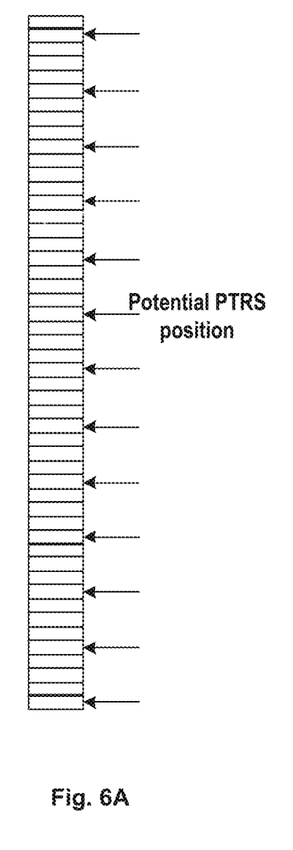
FIG. 6A to 6C schematically illustrate further example association solutions according to embodiments of the present disclosure.
Figure 6B:
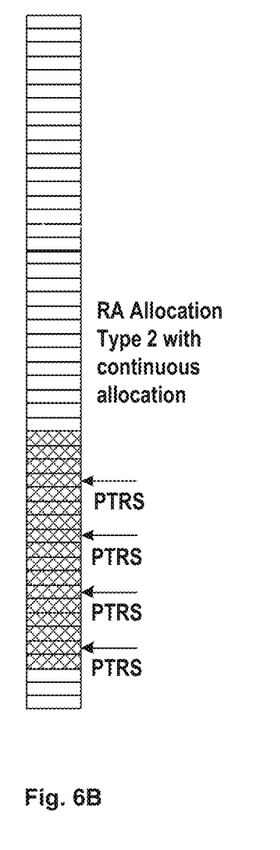
Figure 6C:
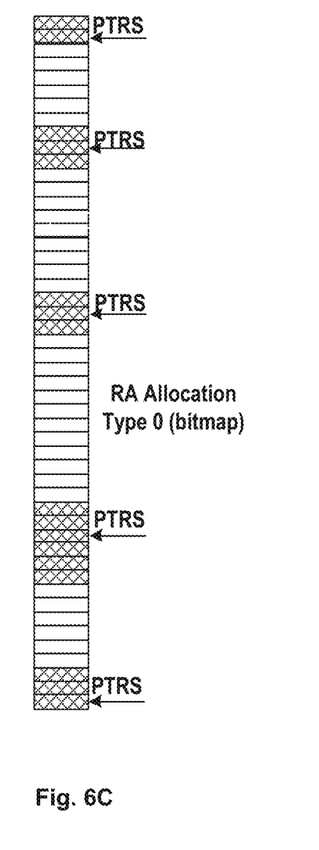

In another embodiment of the present disclosure, the PTRS frequency density can be associated with a common index table with a continuous mapping. In other word, the common index table together indicates all potential PTRS positions, as illustrated in FIG. 6A. For different RA types, it may use different mapping schemes. For example, for RA type 2 with the localized allocation, the PTRS can be directly mapped onto RBs based on the common index table, as illustrated in FIG. 6B. On the contrary, for RA type 0 (bitmap), the PTRS can be mapped onto RBs overlapped with the potential positions as indicated in the common index table, as illustrated in FIG. 6C. Thus, although the PTRS density is the same for all types but the mappings are different and the PTRS can still meet requirements of different cases.

In addition, different PTRS assumptions can be used for different configurations. Herein, configurations include for example, Radio Network Temporary Identity (RNTI) of PDCCH, resource allocation types or the combination thereof. For example, RNTI may include various types, like Random access Radio Network Temporary Identity (RA-RNTI), System Information Radio Network Temporary Identity (SI-RNTI), Paging Radio Network Temporary Identity (P-RNTI), Cell Radio Network Temporary Identity (C-RNTI). For those with low MCS, PTRS may not be transmitted. As an example, for RA-RNTI, SI-RNTI, P-RNTI, there is no need for PTRS, while for the C-RNTI, the PTRS can be used.

Hereinbefore, the PTRS parameter determination solution at the terminal device is described with reference to embodiments of the present disclosure and next the PTRS parameter determination solution at the network device will be described with reference to FIG. 7.

Figure 7:
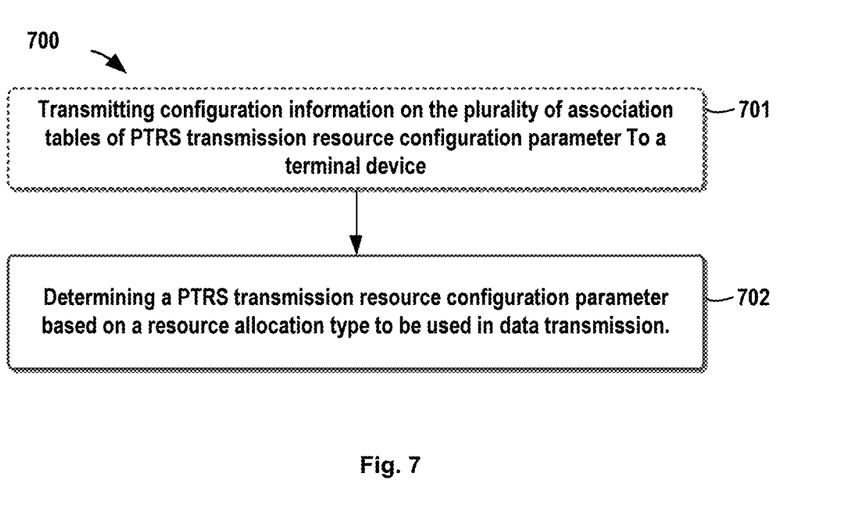
FIG. 7 schematically illustrates a flow chart of a method for determining a PTRS configuration parameter at a network device according to an embodiment of the present disclosure.

FIG. 7 illustrates a flow chart of method of determining PTRS transmission resource configuration parameter at the network device according to an embodiment of the present disclosure. As illustrated in FIG. 7, first in step 701, the network device in the NR system, like gNB, may determine a PTRS transmission resource configuration parameter based on a resource allocation type to be used in data transmission. The PTRS transmission resource configuration parameter may include for example, PTRS frequency density, PTRS resource table, PTRS resource mapping, PTRS transmission positions, etc. Similarly to the terminal device side, at the network device, it is also proposed to use different PTRS transmission resource configuration parameter for different resource allocation type.

The network device may determine the resource allocation type to be used and indicate the resource allocation type to the terminal device in any suitable manner. For example, the network device may contain the resource allocation type information in DCI and transmit the DCI to the terminal device dynamically. Based on the resource allocation type, the network device can select a table corresponding to the detected RA type.

In an embodiment of the present disclosure, the network device may determine an association table corresponding to the resource allocation type from a plurality of association tables of PTRS transmission resource configuration parameter for a plurality of resource allocation types. Additionally, the network device may further obtain the PTRS transmission resource configuration parameter from the association table.

The plurality of association tables can be predetermined tables in the network device; or alternatively, these tables may be variable and are configured in a higher layer signaling, e.g. via RRC signaling or MAC CE, etc. Thus, in step

702, the network device may further transmit configuration information on the plurality of association tables of PTRS transmission resource configuration parameter to a terminal device.

For example association tables, reference can be made to FIGS. 4A to 4C and related description. In the plurality of association tables, it may further comprise different association tables configured for different allocation modes in the same resource allocation type. For example, for RA Type 2, for different resource allocation modes, for example, the localized allocation and the distributed allocation, different tables can be used.

There can be other options for designing the association tables. For example, it is also possible that Type 2 with distributed mode can share the common table with RA type 0. As another example, it is also possible that RA type 0 can be divided into different allocation modes which could use different association tables. For example, all possible patterns of the bitmap can be divided to two allocation modes, those with continuous or localized allocation, and those with distributed allocations. Further, those distributed allocations can be further divided based on the distributed degree. In such a case, it may use more association tables for different distributed modes.

In another embodiment of the present disclosure, the network device may determine a resource mapping corresponding to the resource allocation type from a plurality of resource mappings of PTRS transmission for a plurality of resource allocation types. Further, it is also possible to further obtain the PTRS transmission resource configuration parameter based on the resource mapping. For example, there can be a mapping scheme for RA type 0, another mapping scheme for RA type 2 with localized mode, and a further mapping scheme for RA type 2 with distributed mode. That is to say, the plurality of resource mappings further comprises different resource mappings for different allocation modes in the same resource allocation type.

In addition, it is also possible to adopt other mapping schemes. For example, it is also possible that Type 2 with distributed mode can share the common mapping scheme with RA type 0. As another example, it is also possible that RA type 0 can be divided into different allocation modes which could use different mapping schemes.

In a further embodiment of the present disclosure, the PTRS transmission resource configuration parameter can be associated with sizes of respective resource segments within allocated transmission resources. For example, for RA Type 0 (bitmap), the PTRS frequency density can be associated with the size of the resource segment, i.e. the number of the continuous PRB, or the size of RBG.

Regarding the example mappings, reference could be made to relevant contents described for the terminal device and detailed description will be omitted therein for purpose of simplification. In addition, it can be understand that for the PTRS transmission resource configuration parameter determination at the network device, most of operations are similar to those at the terminal device except those configuration information and RA type indication which are corresponding to those at the terminal device. Thus, for details about the operations at the network device, one may refer to those descriptions with regard to the terminal device.

Thus, it can be seen that, with embodiments of the present disclosure, it may determine different PTRS configuration parameters for different resource allocation types, and thus provide a more suitable PTRS configuration solution for different resource allocation cases.

In addition, in the NR system, it was also agreed to adopt a single PDCCH or multiple PDCCHs to schedule PDSCH from different TRPs. Particularly, single NR-PDCCH can schedule a single NR-PDSCH where separate layers are transmitted from separate TRPs; multiple NR-PDCCHs can each schedule a respective NR-PDSCH wherein each NR-PDSCH is transmitted from a separate TRP. The case, in which each layer is transmitted from all TRPs jointly and single NR-PDCCH schedules single NR-PDSCH can be done in a spec-transparent manner. However, some issues might be caused when two TRPs transmit the same PDSCH to UE. For example, phase noises from the two TRPs are difficult to be distinguished from each other and thus it is hard to compensate the phase noises.

Figure 8:
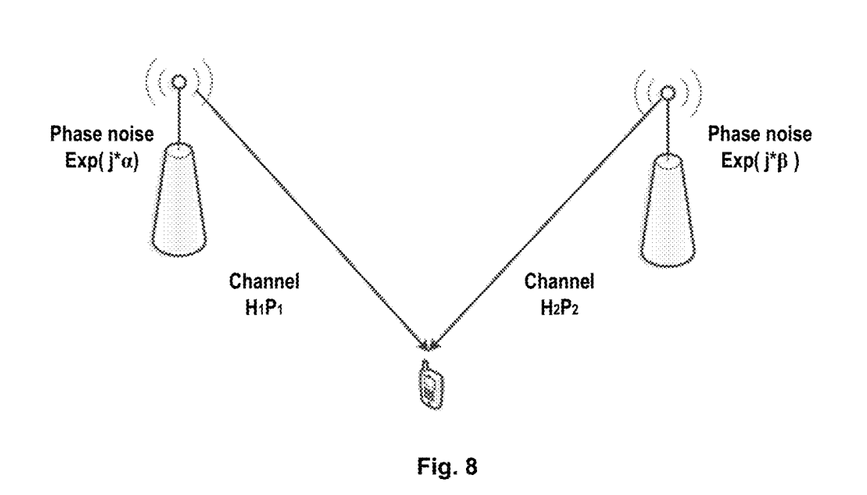
FIG. 8 schematically illustrates a diagram of PTRS transmission in a scenario wherein UE is served by multiple Transmission and Reception Points (TRPs)

As illustrated in FIG. 8, in such a case, the DMRS configurations (e.g. ports, sequences, etc.) will be identical and the equivalent channel can be represented by:

$$(H1*P1+H2*P2), \quad (1)$$

wherein, H1 and H2 represents channel transfer functions of the two channels and P1 and P2 represents the precoders used for the two channels respectively. The phase noise in different symbols is $\exp(j*\alpha)$ for TPR 1 and the phase noise is $\exp(j*\beta)$ for TRP 2. In this case, if separate PTRSs are transmitted from separate TRPs, PTRS transmission will be performed in a non-transparent manner. While if the same PTRS is transmitted from separate TRPs, phase noises from the two TRPs is hard to be distinguished from each other and thus the phase noises cannot be well compensated. For example, in time interval 1, the received PTRS is $$(H1*P1+H2*P2)*S1, \quad (2)$$

in time interval 2, the channel is $$(H1*\exp(j*\alpha1)*P1+H2*\exp(j*\beta1)*P2)*S2. \quad (3)$$

In such a case, parameters $\alpha 1$ and $\beta 1$ cannot be estimated from same PTRS transmission.

Figure 9:
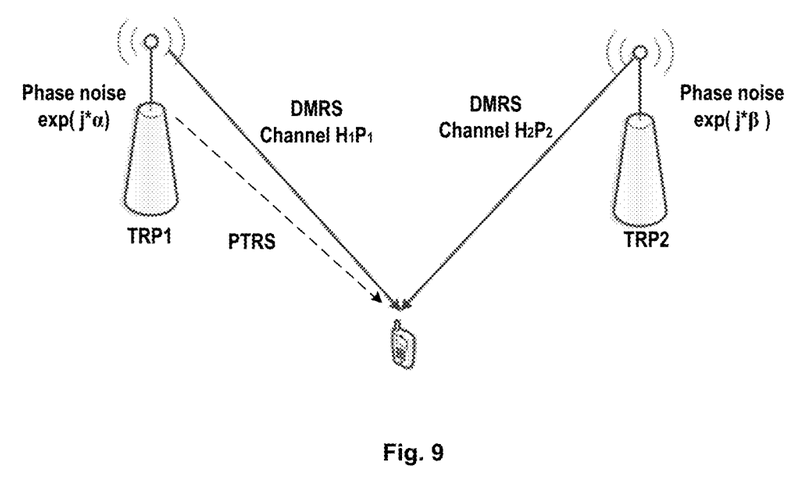
FIG. 9 schematically illustrates a PTRS transmission solution in the scenario wherein the UE is served by multiple TRPs according to an embodiment of the present disclosure.

In an embodiment of the present disclosure, it is proposed that only one TRP transmits PTRS at the PTRS position, as illustrated in FIG. 9. Since only one TRP transmits the PTRS, parameter al can be estimated and thus the estimated channel can be represented by $$(H1*P1+H2*\exp(j*(\beta1-\alpha1))*P2)*S2. \quad (4)$$

Thus, in such a case, at least channel from one TRP can be estimated accurately and well compensated.

Figure 10A:
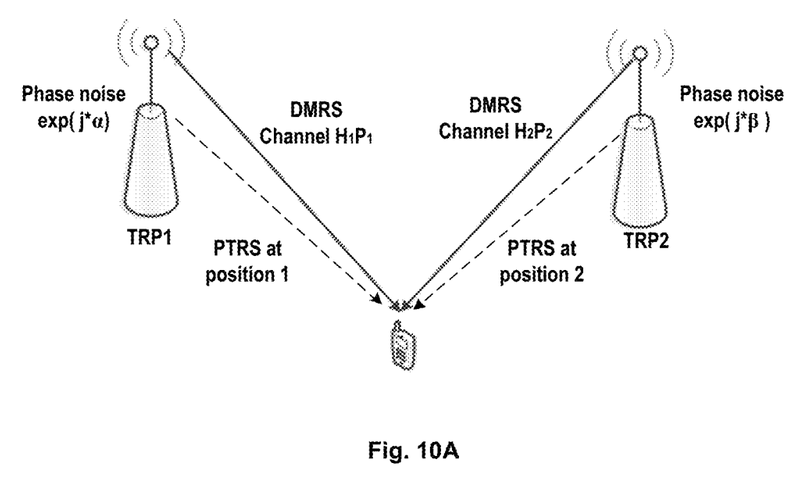
FIGS. 10A and 10B schematically illustrate another PTRS transmission solution in the scenario wherein the UE is served by multiple TRPs according to an embodiment of the present disclosure.
Figure 10B:
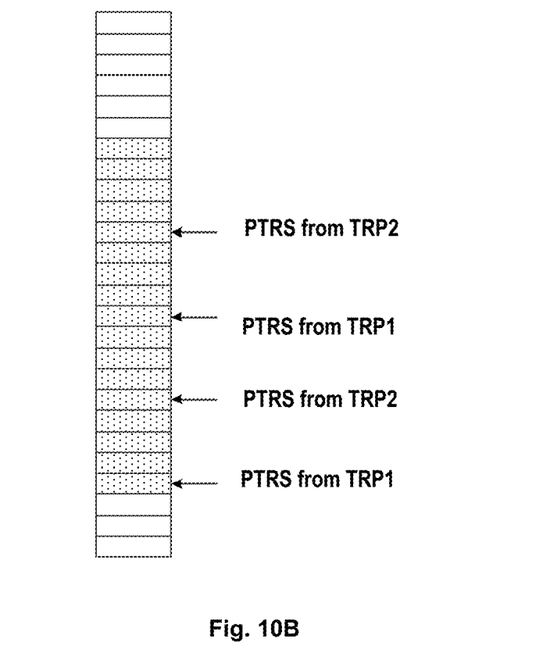

In another embodiment of the present disclosure, different TRPs can transmit PTRS but the transmissions are performed at different PTRS positions, as illustrated in FIG. 10A. As an example, these TRPs can take turns at transmitting PTRS at the potential PTRS positions, as illustrated in FIG. 10B. In such a case, it is also possible to increase the frequency density. That is to say, the UE can be configured with PTRS with higher density if the multiple TRPs transmit all layers to the UE. In this way, at one time, at least there is one channel from one TRP that can be estimated accurately and well compensated. Or alternatively, average phase noise from two TRPs can be used for CPE compensation. For example, $(\alpha1+\beta1)/2$ can be estimated and the estimated channel can be $$(H1*\exp(j*(\alpha1-\beta1)/2)*P1+H2*\exp(j*(\beta1-\alpha1)/2)* P2)*S2. \quad (5)$$

In such a case, it can achieve a better compensation as well.

In a further embodiment of the present disclosure, separate DMRS and/or PTRS design are used to this scenario. Separate DMRS and/or PTRS design for this scenario.

Figure 11:
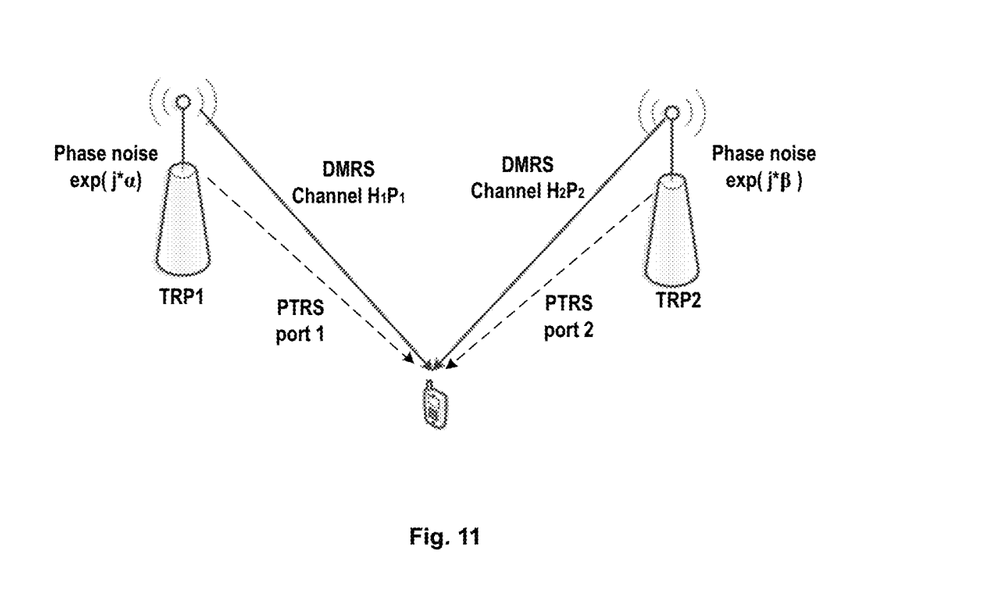
FIG. 11 schematically illustrates a further PTRS transmission solution in the scenario wherein the UE is served by multiple TRPs according to an embodiment of the present disclosure.

For PTRS, more PTRS ports can configured for this scenario. For example, there are N ports for PTRS, and N/2 from TRP1 and N/2 from TRP2, as illustrated in FIG. 11. As another example, orthogonal PTRS ports can be kept unchanged; PTRS from different TRPs are transmitted on the same REs, but the sequences for transmitting the PTRS can be different. In such a case, for example, average phase noise from two TRPs can be used for compensation.

Additionally, or alternatively, for DMRS, more DMRS ports can be configured for this scenario. For example, there are N ports for DMRS, and N/2 from TRP1 and N/2 from TRP2. As another example, orthogonal PTRS ports can be kept unchanged; DMRS from different TRPs are transmitted on the same REs, but the sequences for transmitting the DMRS can be different.

With this solution, UE can estimate channels and/or phase noise for each TRP.

In addition, in a further embodiment of the present disclosure, the TRPs may exchange phase noise information. By means of exchange of the phase noise information, a TRP may learn phase noise and this information can be used during transmitting the PTRS so that the multiple TRPs have substantially the same or similar phase noise, when observed by UE. Or alternatively, one TRP may transmit PTRS to other TRPs, which may receive the PTRS, and estimate the phase noise. Then the TRPs may transmit signals or channels multiplied with the estimated phase noise values.

Figure 12:
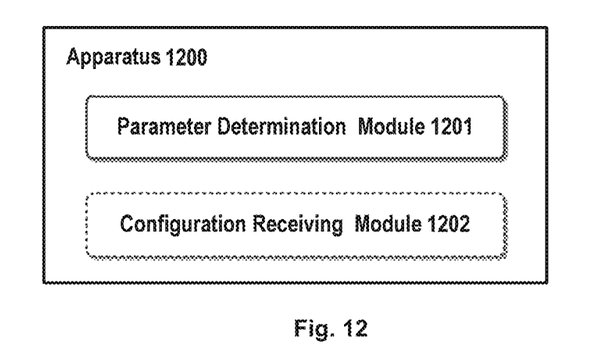
FIG. 12 schematically illustrates a block diagram of an apparatus for determining a PTRS configuration parameter at a terminal device according to an embodiment of the present disclosure.

FIG. 12 further illustrates an apparatus for determining PTRS transmission resource configuration parameter at a terminal device according to an embodiment of the present disclosure. Apparatus 1200 can be implemented at a terminal device such as UE.

As illustrated in FIG. 12, apparatus 1200 comprises a parameter determination module 1201. The parameter determination module 1201 may be configured to determine a PTRS transmission resource configuration parameter based on a resource allocation type to be used in data transmission.

In an embodiment of the present disclosure, the parameter determination module 1201 may be further configured to determine, from a plurality of association tables of PTRS transmission resource configuration parameter for a plurality of resource allocation types, an association table corresponding to the resource allocation type; and obtain the PTRS transmission resource configuration parameter from the association table.

In another embodiment of the present disclosure, the plurality of association tables may further comprise different association tables configured for different allocation modes in the same resource allocation type.

In a further embodiment of the present disclosure, apparatus 1200 may further comprise a configuration receiving module 1202. The configuration receiving module 1202 may be configured to receive configuration information on the plurality of association tables of PTRS transmission resource configuration parameter from a network device.

In a still further embodiment of the present disclosure, the parameter determination module 1201 may be further configured to determine, from a plurality of resource mappings of PTRS transmission for a plurality of resource allocation types, a resource mapping corresponding to the resource allocation type; and determine the PTRS transmission resource configuration parameter based on the resource mapping.

In a yet further embodiment of the present disclosure, the plurality of resource mappings may further comprise different resource mappings for different allocation modes in the same resource allocation type.

In a yet still further embodiment of the present disclosure, the PTRS transmission resource configuration parameter may be associated with sizes of respective resource segments within allocated transmission resources.

Figure 13:
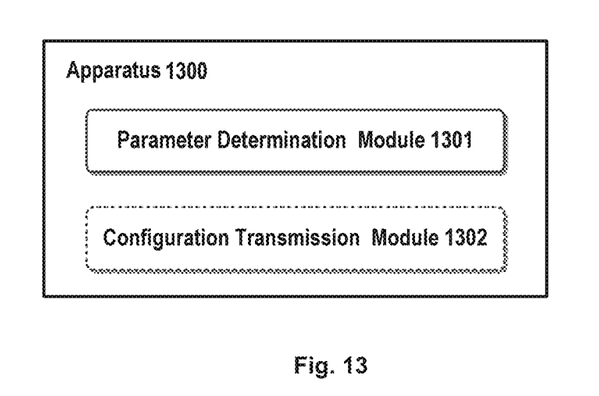
FIG. 13 schematically illustrates a block diagram of an apparatus for determining a PTRS configuration parameter at a network device according to an embodiment of the present disclosure.

FIG. 13 illustrates a block diagram of determining a PTRS configuration parameter at a network device according to an embodiment of the present disclosure. As illustrated in FIG. 1300, apparatus 1300 may comprise a parameter determination module 1301. The parameter determination module 1301 may be configured to determine a PTRS transmission resource configuration parameter based on a resource allocation type to be used in data transmission.

In an embodiment of the present disclosure, the parameter determination module 1301 may be configured to determine, from a plurality of association tables of PTRS transmission resource configuration parameter for a plurality of resource allocation types, an association table corresponding to the resource allocation type; and obtain the PTRS transmission resource configuration parameter from the association table.

In another embodiment of the present disclosure, the plurality of association tables may further comprise different association tables configured for different allocation modes in the same resource allocation type.

In a further embodiment of the present disclosure, apparatus 1300 may further comprise a configuration transmission module 1302. The configuration transmission module 1302 may be configured to transmit configuration information on the plurality of association tables of PTRS transmission resource configuration parameter to a terminal device.

In a still further embodiment of the present disclosure, the parameter determination module 1301 may be configured to determine, from a plurality of resource mappings of PTRS transmission for a plurality of resource allocation types, a resource mapping corresponding to the resource allocation type; and determine the PTRS transmission resource configuration parameter based on the resource mapping.

In a yet further embodiment of the present disclosure, the plurality of resource mappings may further comprise different resource mappings for different allocation modes in the same resource allocation type In still yet further embodiment of the present disclosure, the PTRS transmission resource configuration parameter may be associated with sizes of respective resource segments within allocated transmission resources Hereinbefore, the apparatuses 1200 and 1300 are described with reference to FIGS. 12 and 13 in brief. It is noted that the apparatuses 1200 and 1300 may be configured to implement functionalities as described with reference to FIGS. 3 to 11. Therefore, for details about the operations of modules in these apparatuses, one may refer to those descriptions made with respect to the respective steps of the methods with reference to FIGS. 3 to 11.

It is further noted that components of the apparatuses 1200 and 1300 may be embodied in hardware, software, firmware, and/or any combination thereof. For example, the components of apparatuses 1200 and 1300 may be respectively implemented by a circuit, a processor or any other appropriate selection device.

Those skilled in the art will appreciate that the aforesaid examples are only for illustration not limitation and the present disclosure is not limited thereto; one can readily conceive many variations, additions, deletions and modifications from the teaching provided herein and all these variations, additions, deletions and modifications fall the protection scope of the present disclosure.

In addition, in some embodiment of the present disclosure, apparatuses 700 and 800 may comprise at least one processor. The at least one processor suitable for use with embodiments of the present disclosure may include, by way of example, both general and special purpose processors already known or developed in the future. Apparatuses 1200 and 1300 may further comprise at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause apparatuses 1200 and 1300 to at least perform operations according to the method as discussed with reference to FIGS. 3 to 11 respectively.

Figure 14:
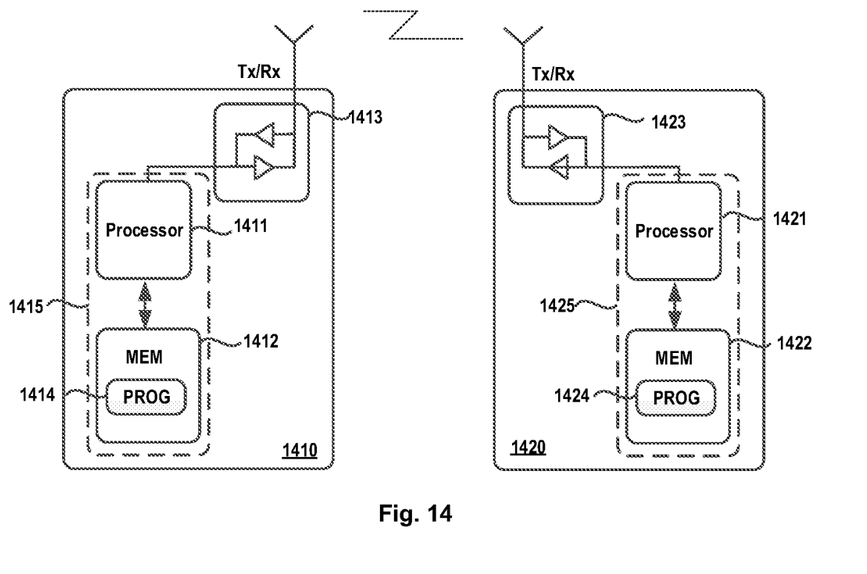
FIG. 14 further illustrates a simplified block diagram of an apparatus 1410 that may be embodied as or comprised in a network device (like gNB), and an apparatus 1420 that may be embodied as or comprised in a terminal device like UE as described herein.

FIG. 14 further illustrates a simplified block diagram of an apparatus 1410 that may be embodied as or comprised in a network device like a base station in a wireless network and an apparatus 1420 that may be embodied as or comprised in a terminal device like UE as described herein.

The apparatus 1410 comprises at least one processor 1411, such as a data processor (DP) and at least one memory (MEM) 1412 coupled to the processor 1411. The apparatus 1410 may further comprise a transmitter TX and receiver RX 1413 coupled to the processor 1411, which may be operable to communicatively connect to the apparatus 1420. The MEM 1412 stores a program (PROG) 1414. The PROG 1414 may include instructions that, when executed on the associated processor 1411, enable the apparatus 1410 to operate in accordance with embodiments of the present disclosure, for example the method 700. A combination of the at least one processor 1411 and the at least one MEM 1412 may form processing means 1415 adapted to implement various embodiments of the present disclosure.

The apparatus 1420 comprises at least one processor 1421, such as a DP, and at least one MEM 1422 coupled to the processor 1421. The apparatus 1420 may further comprise a suitable TX/RX 1423 coupled to the processor 1421, which may be operable for wireless communication with the apparatus 1410. The MEM 1422 stores a PROG 1424. The PROG 1424 may include instructions that, when executed on the associated processor 1421, enable the apparatus 1420 to operate in accordance with the embodiments of the present disclosure, for example to perform the method 300. A combination of the at least one processor 1421 and the at least one MEM 1422 may form processing means 1425 adapted to implement various embodiments of the present disclosure.

Various embodiments of the present disclosure may be implemented by computer program executable by one or more of the processors 1411, 1421, software, firmware, hardware or in a combination thereof.

The MEMs 1412 and 1422 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 1411 and 1421 may be of any type suitable to the local technical environment, and may include one or more of general purpose computers, special purpose computers, microprocessors, digital signal processors DSPs and processors based on multicore processor architecture, as non-limiting examples.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with one embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method performed by a terminal device, comprising:
  determining a Phase Tracking Reference Signal (PTRS) transmission resource configuration parameter based on a waveform type to be used in data transmission,
  wherein determining the PTRS transmission resource configuration parameter based on the waveform type further comprises:
  determining, from a plurality of association tables of PTRS transmission resource configuration parameter for a plurality of waveform types, an association table corresponding to the waveform type; and
  obtaining the PTRS transmission resource configuration parameter from the association table.

2. The method of claim 1, wherein the plurality of association tables further comprise different association tables configured for different allocation modes in a same waveform type.

3. The method of claim 2, further comprising receiving configuration information on the plurality of association tables of PTRS transmission resource configuration parameter from a network device.

4. The method of claim 1, wherein the waveform type is associated with at least one of a plurality of resource allocation types.

5. A method performed by a network device, comprising:
  determining a Phase Tracking Reference Signal (PTRS) transmission resource configuration parameter based on a waveform type to be used in data transmission,
  wherein determining the PTRS transmission resource configuration parameter based on the waveform type further comprises:
  determining, from a plurality of association tables of PTRS transmission resource configuration parameter for a plurality of waveform types, an association table corresponding to the waveform type; and
  obtaining the PTRS transmission resource configuration parameter from the association table.

6. The method of claim 5, wherein the plurality of association tables further comprise different association tables configured for different allocation modes in the same waveform type.

7. The method of claim 5, further comprising
  transmitting configuration information on the plurality of association tables of PTRS transmission resource configuration parameter to a terminal device.

8. The method of claim 5, wherein the PTRS transmission resource configuration parameter is associated with sizes of respective resource segments within allocated transmission resources.

9. A terminal device, comprising:
  a controller, configured to determine a PTRS transmission resource configuration parameter based on a waveform type to be used in data transmission,
  wherein the controller is further configured to:
  determining, from a plurality of resource mappings of PTRS transmission for a plurality of waveform types, a resource mapping corresponding to the waveform type; and
  determine the PTRS transmission resource configuration parameter based on the resource mapping.

10. The terminal device of claim 9, wherein the plurality of resource mappings further comprises different resource mappings for different allocation modes in the same waveform type.

11. The terminal device of claim 9, wherein the PTRS transmission resource configuration parameter is associated with sizes of respective resource segments within allocated transmission resources.

* * * * *